INVENTOR.
Josef Johann Pelikan
BY
Arthur A. March
ATTORNEY

June 6, 1967   J. J. PELIKAN   3,323,433
PHOTOGRAPHIC INTRA-LENS SHUTTER
Filed March 24, 1965   3 Sheets-Sheet 2

INVENTOR.
Josef Johann Pelikan
BY
Arthur A. March
ATTORNEY

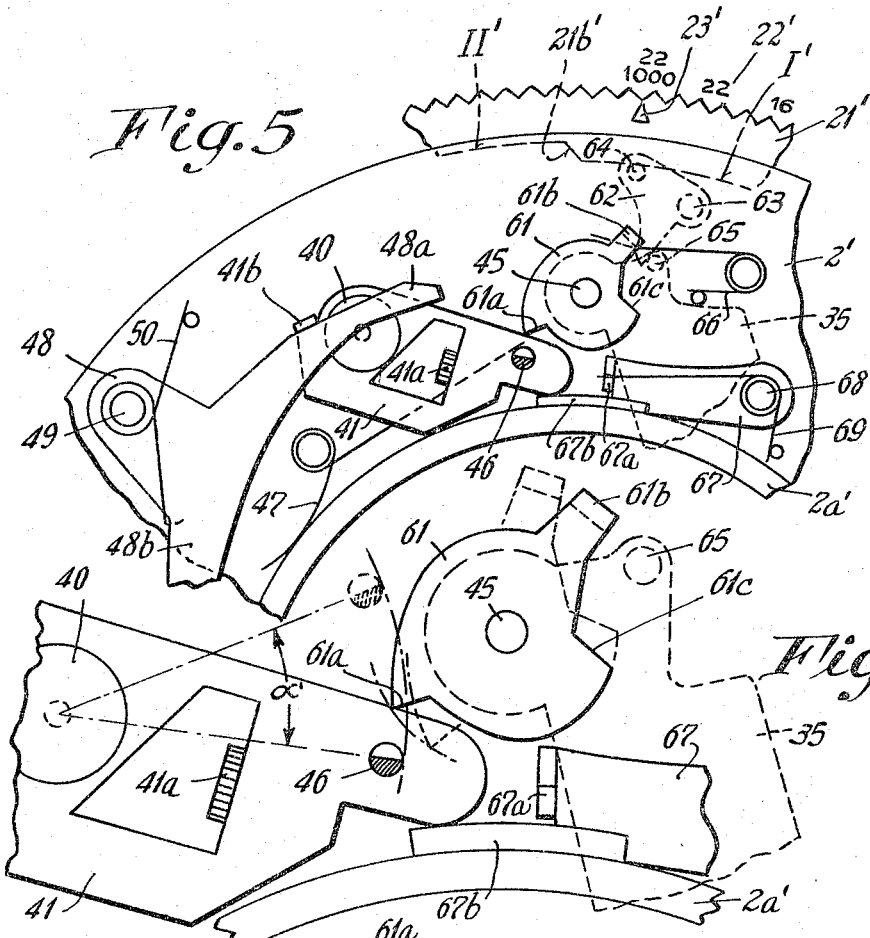
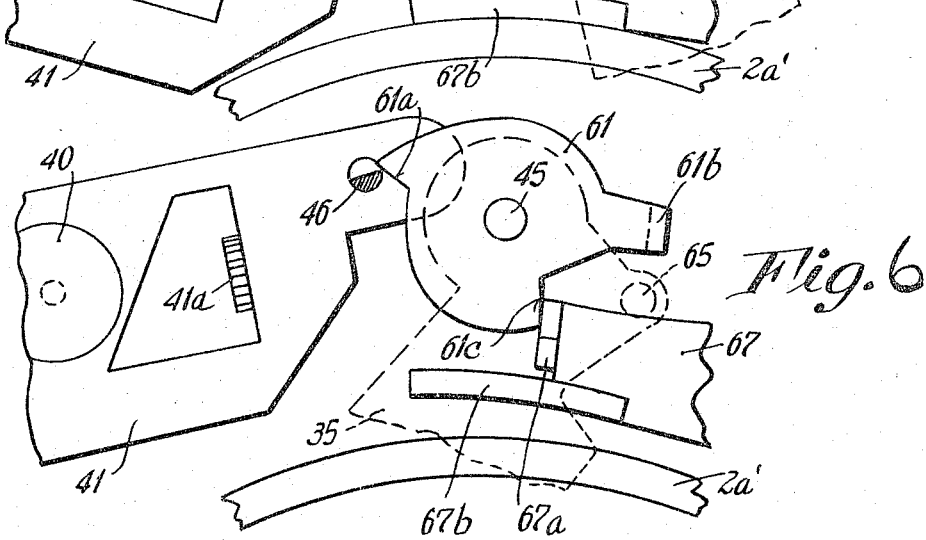

United States Patent Office 3,323,433
Patented June 6, 1967

3,323,433
PHOTOGRAPHIC INTRA-LENS SHUTTER
Josef Johann Pelikan, Calmbach (Enz), Germany, assignor to Prontor-Werk Alfred Gauthier, G.m.b.H., Calmbach (Enz), Germany, a corporation of Germany
Filed Mar. 24, 1965, Ser. No. 442,327
Claims priority, application Germany, Mar. 28, 1964, G 40,219
4 Claims. (Cl. 95—53)

The present invention relates to a photographic intra-lens shutter of the type described and claimed in copending United States application Ser. No. 312,089, assigned to the same assignee, wherein the photographic intra-lens shutter has setting controls for both diaphragm and exposure time which may be set independent of each other at specific values by way of different scales. In order to provide the shutter described in the aforementioned copending application with a greater exposure value setting range, the copending application proposes to provide the scale associated with the diaphragm setting control with at least one additional scale or exposure value which follows the smallest diaphragm value. A mechanism is provided for obtaining an extremely short exposure time exceeding the maximum value of the exposure time scale when the shutter is set for the smallest diaphragm aperture. The mechanism for obtaining this extremely short exposure time may be connected and disconnected by means of the diaphragm setting control.

An intra-lens shutter developed according to the principles of the aforementioned copending application has the advantage that it permits the development of exposure times of substantially shorter duration which, in turn, make it possible to use highly sensitive film material without the risk of overexposure. Briefly, the manner in which this result is achieved is that the conventional shutter blade system is supplemented with a rotatably positioned cover blade which acts in conjunction with the driving device of the shutter and which closes the diaphragm aperture earlier than usual during the exposure rundown.

It is an object of the present invention to provide an intra-lens shutter which comprises the essential features of the aforementioned copending application, but which utilizes fewer components without any sacrifice in dependability and precision of operation.

This result is achieved by mounting the cover blade on a shaft which is rotatably positioned in a wall of the shutter housing. The shaft carries at one end a coupling member which is non-rotatably connected to the shaft and is provided with a radial projection which, when the diaphragm setting control is set at the additional exposure value, enters the path of motion of a driver provided on the driving device of the shutter. Such an arrangement makes it possible to position the cover blade in a simpler manner, thereby making it less susceptible to malfunctions and hence has a favorable effect on the life of the shutter arrangement.

In general, a cocking shutter according to the present invention is provided with a driving disk which is operatively connected to the shutter blade driving ring by way of a driving pawl or similar element. A lug or stud serving to arrest the shutter in the cocked position is provided on the periphery of the driving disk. In a preferred embodiment of the invention, the stud of the driving disk also serves as a driver or catch and cooperates with a pawl which is rotatably positioned on the shaft upon which the cover blade is mounted. For one direction of rotation, the pawl is in driving connection with a coupling member, in the form of a disk, by means of a pin fixed to the coupling member.

The present invention also has application in an automatic cocking shutter. In one such shutter, the driving device comprises a shutter blade actuating lever which is in pin-slot connection with the shutter blades and executes a reciprocating motion for opening and closing the shutter blades. In such a device, the present invention provides that the shutter blade actuating lever carry a driving pin which cooperates with a radial projection provided on the periphery of a coupling disk and that another radial projection provided on the periphery of the coupling disk, in cooperation with an arresting pawl acted upon by an adjusting spring, prevents the return motion of the additional cover blade until the end of the exposure run-down or until the shutter blade actuating lever has returned to its starting position.

The invention will now be explained by way of two embodiments described in the specification which follows and illustrated in the accompanying drawing, in which:

FIG. 5 is an enlarged view of those members of the automatic cocking shutter which are adapted to directly drive the cover blade;

FIG. 6 shows the cooperation of the shutter blade actuating lever and the coupling member of the cover blade with the cover blade in the closed position; and FIG. 7 shows the shutter blade actuating lever and the position of the cover blade after the cover blade has returned to the starting position, the dot-dash lines depicting the position of the coupling member when the cover blade is inoperative.

Figure 1:
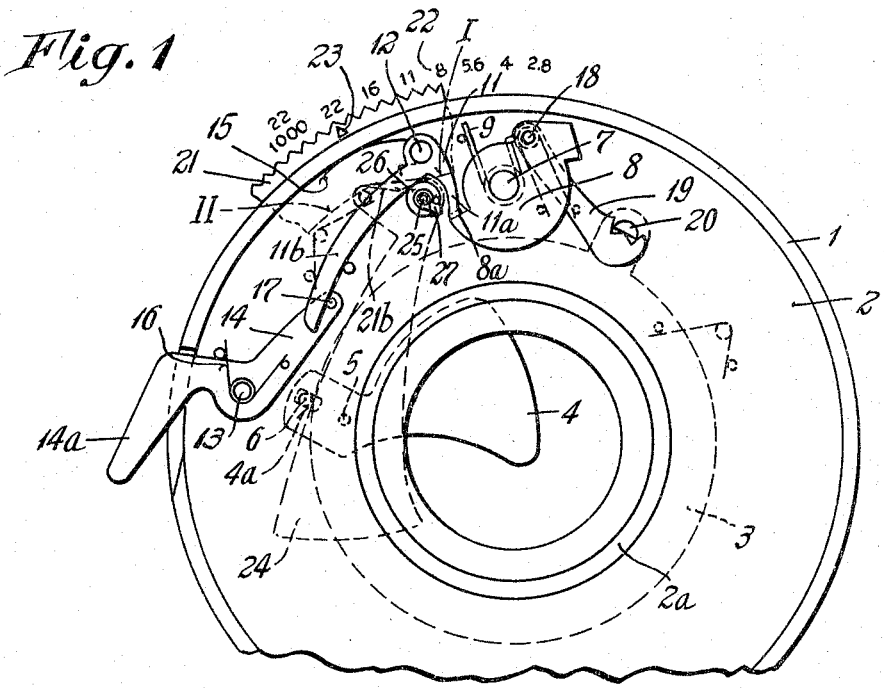
FIG. 1 shows one embodiment of the present invention in a cocking shutter.
Figure 2:
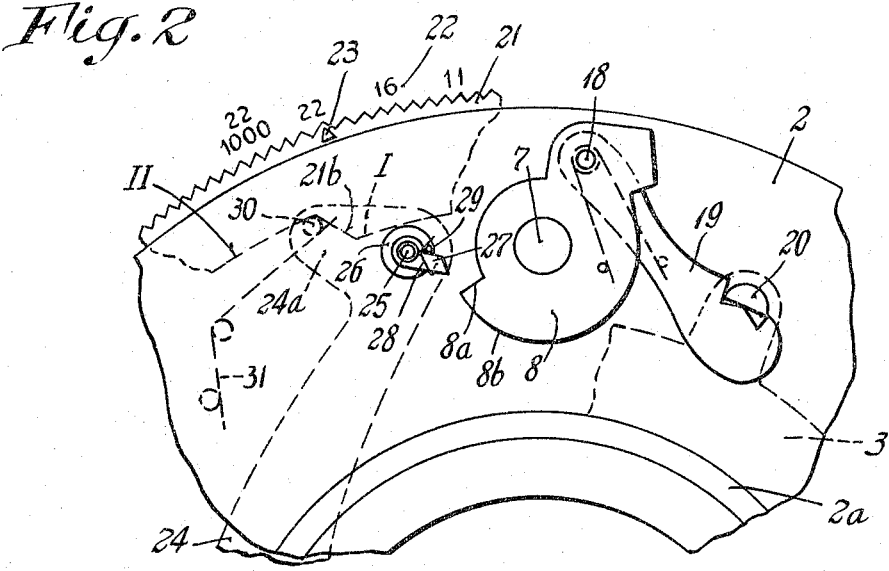
FIG. 2 is an enlarged view of the driving mechanism of the cocking shutter of FIG. 1 along with the cover blade and the coupling member with the radial projection of the coupling member positioned off of the path of motion of a lug provided on the driving disc.
Figure 3:
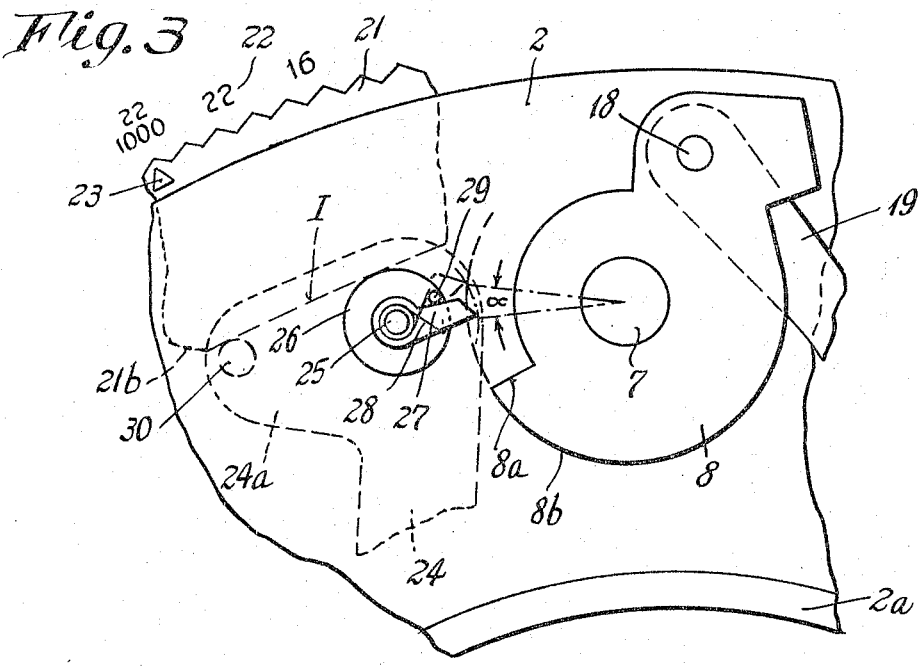
FIG. 3 shows the cover blade and the coupling member in another setting position with the radial projection of the coupling member in the path of motion of the stud provided on the driving disc.

Referring to FIGS. 1 through 3, the cocking shutter shown therein includes a housing 1 and a base plate 2 affixed to the housing in the usual manner. The base plate 2 is provided with a tubular connection or socket 2a adapted to receive a lens assembly. A ring 3 adapted to drive a plurality of shutter blades 4, only one of which is shown in FIG. 1 for the sake of clarity, is rotatably positioned on the rear wall of the base plate 2. The shutter blades 4 are rotatably positioned on the driving ring 3 by means of pins or pivots 5 and are guided in their movement by means of fixed pins 6 secured to the base plate 2 and slots 4a in the shutter blades.

The base plate 2 also carries a shaft 7. The driving disc 8 of the shutter is arranged on one end of the shaft 7 in the usual manner. In order to move the driving disc 8 into the cocked position, the other end of the shaft 7 projecting outward from the rear wall of the shutter housing 1 may be operatively connected in the usual manner to the film transport mechanism of the camera by means of an actuating device which is not shown in the drawings. A coil spring 9 which is mounted on the shaft 7 acts upon the driving disc 8 and exerts a clockwise moment of rotation upon the disc. The driving disc 8 is held in the cocked position by a two-armed arresting lever 11 which is positioned on a shaft 12. Arm 11a of the arresting lever 11 occupies a position in the path of motion of a stud or lug 8a on the driving disc 8, while the other arm 11b of the arresting lever 11 occupies a position in the range of motion of a release lever 14 rotatably positioned on a fixed shaft 13. The release lever 14 has a finger piece portion 14a projection from the lateral wall of the shutter housing 1. A spring 15 acts upon the arresting lever 11 and tends to rotate the arresting lever counterclockwise. So long as this condition exists, a second spring 16, associated with the release lever 14, holds the release lever in engagement with the arm 11b of the arresting lever through a pin 17. A driving pawl 19 is articulately positioned upon a pin or pivot 18 secured to the driving disc 8. The driving pawl 19 is operatively connected to the shutter blade driving ring 3 in the usual manner by means of a pin 20 on the driving ring located at the free end of the driving pawl.

Also included in the cocking shutter is a diaphragm which may be set at different aperture widths. For the sake of clarity, the drawing shows only the setting control 21 of the diaphragm. A scale 22 including, for example, diaphragm values from "2.8" to "22" is associated with the diaphragm setting control 21. A setting mark 23 arranged on the setting control 21 is used in conjunction with the scale 22 to set the desired diaphragm aperture. For an exposure time range extending from $\frac{1}{30}$ second to $\frac{1}{500}$ second, the exposure value setting range will have limiting values of "8" and "18" for the abovementioned diaphragm value range. To supplement this conventional exposure setting range, provision is made for another exposure value. This additional exposure value is formed by a diaphragm value of "22" and an exposure time of extremely short duration, for example, in the order of magnitude of $\frac{1}{1000}$ second.

In order to effect such an extremely short exposure time, the shutter includes, in addition to the conventional shutter blades 4, a cover blade 24 which upon the setting of the additional exposure value, covers the diaphragm aperture opened by the shutter blades 4 during the rundown of the shutter and before the shutter blades have returned to the closed positions. The movement of the cover blade 24 is effected by means of a shaft 25 which is rotatably positioned on the base plate 2. A coupling member 26, preferably in the form of a disc, is secured to one end of the shaft 25 and rotates with the shaft. As is most apparent from FIGS. 2 and 3, a radially projecting extension 27 is associated with the coupling disc 26. For the embodiment of the invention shown in FIGS. 1 through 3, the projection 27 is in the form of a pawl which is rotatably positioned on the shaft 25. The pawl 27 is kept in continuous contact with a pin 29 on the coupling disc 26 due to the action of a spring 28.

Whenever the diaphragm setting control 21 is set at the additional exposure value corresponding to a diaphragm value of "22" and an exposure time of "$\frac{1}{1000}$ second," the coupling disc 26 and the pawl 27 are so positioned that the free end of the pawl is in the path of motion of the lug 8a. Otherwise, the coupling disc 26 occupies a position in which the lug 8a of the driving disc 8 moves past the pawl 27 without any interaction between the pawl and the lug 8a. In order to move the cover blade 24 or the coupling disc 26 into the respective setting positions, the cover blade is provided with an arm 24a (FIG. 2) having an adjusting pin 30 at its free end. The pin 30 bears against a control edge 21b of the diaphragm setting control 21 due to the action of a spring 31. The control edge 21b includes two regions I and II. Region I becomes the operative region when the setting control 21 is set at the additional exposure value. The result, as illustrated in FIG. 3, is that the free end of the pawl 27 enters the path of motion of the lug 8a of the driving disc 8. If the driving disc 8 is released for such a setting of the cover blade 24, the disc executes a rotary movement, in a clockwise direction with the result that the lug 8a abuts against the pawl 27 at the moment at which the shutter blades 4 have just opened the diaphragm aperture. The pawl 27 undergoes a rotary movement while the disc 8 moves through an angular range α. This results in the cover blade 24 closing the diaphragm aperture which has just been opened. The outer edge 8b of the driving disc 8 acts as a support for the pawl 27 while the driving disc continues through its rotary motion and holds the cover blade 24 in the covered position until the shutter driving mechanism has again been moved into the cocked position.

If, on the other hand, the setting control 21 is set at one of the diaphragm values of the scale 22, region II becomes the operative one and the cover blade 24 occupies the setting position illustrated in FIG. 2. In this setting position, the pawl 27 is located off of the path of motion of the lug 8a of the driving disc 8 with the result that the usual run-down movement occurs and the diaphragm aperture is opened and closed solely by the shutter blades 4.

The unilateral driving connection of the pawl 27 and the coupling disc 26 permits switching the setting control 21 to the additional exposure value even when the driving disc 8 is in the uncocked position. In this case, switching can be effected only when the pawl 27 engaging the outer edge 8b of the driving disc 8 permits the coupling disc 26 to execute a counter-clockwise rotary movement about the pivot axis of the shaft 25.

FIGS. 4 through 7 illustrate a second embodiment of the invention wherein the cover blade 35 is arranged in an automatic cocking shutter. Such a shutter includes a housing 1' and a base plate 2'. A shutter blade actuating lever 41 is positioned on the base plate 2' by means of a pin or pivot 40. The lever 41 serves to actuate a pair of shutter blades 42 and 43 arranged at the rear wall of the base plate. Shutter blade 42 is rotatably arranged on a pin or pivot 44, while shutter blade 43 is rotatably mounted on a shaft 45. Shaft 45 is, in turn, rotatably positioned on the base plate 2' and also serves to move the cover blade 35. Shutter blade 42 is provided with a slot 42a, while shutter blade 43 is provided with a slot 43a. A pin 46 fixed to the shutter blade actuating lever 41 engages the two shutter blades 42 and 43 by means of the slots 42a and 43a, respectively.

Figure 4:
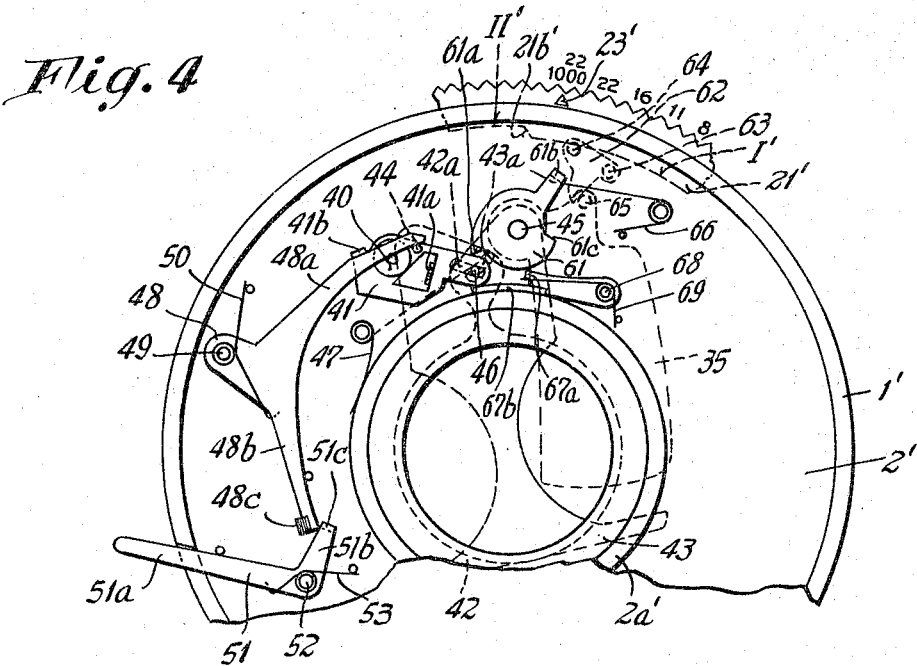
FIG. 4 shows the present invention in an automatic cocking shutter.

In the inoperative position of the shutter, the shutter blade actuating lever 41 occupies the starting position, illustrated in FIGS. 4 and 5, in which the shutter blades 42 and 43 cover the lens aperture. This is due to the action of a spring 47 acting upon the lever 41. If the shutter blade actuating lever 41 is moved in a counterclockwise direction, the shutter blades 42 and 43 swing out about their respective bearings 44 and 45, and thereby open the lens aperture of the shutter.

A two-armed driving lever 48 is provided for driving the shutter blade actuating lever 41. The driving lever 48 is rotatably positioned on a pin or pivot 49 on the base plate 2' and is acted upon by a driving spring 50. The arm 48a of the driving lever 48 acts, in a manner to be described in detail below, in conjunction with a lug 41a bent off of the blade actuating lever 41, while the arm 48b of the driving lever 48 establishes the connection to a cocking and release lever 51. Lever 51 is positioned on a shaft 52 on the base plate 2' and is acted upon by a spring 53 which returns the lever to the end position illustrated in FIG. 4. The arm 51a of the lever 51 is in the form of a finger piece and projects from the side wall of the shutter housing whereas the arm 51b has a bent off lug 51c which acts in conjunction with a bent off portion 48c of the driving lever 48. When the cocking and release lever 51 is depressed, the lug 51c engages the bent off portion 48c whereby the driving lever 48 is rotated clockwise and the driving spring 50 is cocked. The arm 48a of the driving lever slides along the beveled or sloping face of the lug 41a on the shutter blade actuating lever 41 and finally becomes engaged on the opposite side of the lug. In a subsequent phase of the movement of the cocking and release lever 51, the lug 51c releases the driving lever 48 resulting in the driving lever returning to the starting position illustrated in FIG. 4 and thereby rotating the shutter blade actuating lever 41 in a counterclockwise direction. This rotary movement of the shutter blade actuating lever 41 causes the shutter blades 42 and 43 to swing outward about their bearings 44 and 45. As soon as the shutter blades 42 and 43 reach their open position, the arm 48a becomes disengaged from the lug 41a. Immediately thereafter, the arm 48a engages the lug 41b of the shutter blade actuating lever 41, thereby causing a reversal of the relative movements and a return of the shutter blades 42 and 43 to the closed position. In order to return the cocking and release lever 51 to the starting position shown in FIGS. 4 and 5 after an exposure has been effected, the bent off portion 48c of the driving lever 48 is shaped on its upper side as an inclined surface over which the lug 51c of the cocking and release lever 51 slides when returning to the starting position.

In order to effect the extremely short exposure time, the automatic cocking shutter includes, in addition to the shutter blades 42 and 43, a cover blade 35 driven by the shaft 45 which also serves to position the shutter blade 43. A coupling disc 61 is arranged at the opposite end of the shaft 45 in a manner similar to that described in connection with the embodiment shown in FIGS. 1 and 3. As is most apparent from FIG. 7, the coupling disc 61 includes a radial projection 61a which cooperates with the pin 46 arranged on the shutter blade actuating lever 41. The pin 46 serves as a catch. The end of the pin 46 which acts upon the coupling disc 61 may be of semi-circular cross section which insures a more precise disruption of the driving connection between the pin 46 and the projection 61a during the run-down of the shutter.

The connection and disconnection of the cover blade 35 may be effected in the same manner as the shutter arrangement shown in FIGS. 1 through 3. Specifically there is provided in the embodiment of FIGS. 4 through 7 a control edge 21b' on the diaphragm setting control 21'. The edge 21b' includes a first region I' associated with the additional exposure value (a diaphragm aperture value of "22" and an exposure time of 1/1000 second) along with a second region II' which is operative over the range of the diaphragm scale 22'. A lever 62, positioned on the base plate 2' by means of a pin or pivot 63, is used to transmit the control effect contained in the shape of the control edge 21b'. The lever 62 carries at one end a pin 64 which senses the control edge 21b, while at the other end of the lever acts in conjunction with a pin 65 fixed to the cover blade 35. The coupling disc 61, non-rotatably affixed to the shaft 45, is provided with an arm 61b which is acted upon by a coil spring 66. The spring 66 tends to rotate the cover blade 35 in a counterclockwise direction, but is prevented from doing so by the lever 62, which abuts against the control edge 21b'.

When the diaphragm setting control 21' is set at the additional exposure value, the pin 64 bears against region I' of the control edge 21b' as illustrated in FIGS. 4 and 5. The cover blade 35 is thus moved to the diaphragm aperture while, at the same time, the coupling disc 61 occupies a position in which the projection 61a is located in the path of motion of the driving pin 46. This results in the driving pin 46 impinging upon the projection 61a at the moment at which the shutter blades 42 and 43 have just opened the smallest diaphragm aperture, thereby driving the coupling disc 61 as well as the cover blade 35 in a clockwise direction through an angle α'. The cover blade 35 is thus moved into a new position in which it closes the diaphragm aperture which has just been opened by the shutter blades 42 and 43.

In order to prevent the cover blade 35 from returning to the open position before the shutter blades 42 and 43 have closed the lens aperture, an arresting pawl 67 is provided which holds the cover blade in the covering position at least until the shutter blades 42 and 43 again occupy the closed aperture position. The arresting pawl 67 is positioned on a pin or pivot 68 in the base plate 2' and is urged to move in the clockwise direction by the coil spring 69. The free end of the arresting pawl 67 is provided with a bent off lug 67a which engages beyond another radial projection 61c on the circumference of the coupling disc 61 due to the action of the spring 69 as soon as the cover blade 35 has reached the covering position during the rundown of the shutter. This is illustrated in FIG. 6. The arresting pawl 67 is provided with a blade 67b with which the free end of the shutter blade actuating lever 41 cooperates so that the lever 41 impinges on the blade at the end of the run-down of the shutter, thereby removing the arresting pawl from engagement with the coupling disc. After this has occurred, the coupling disc 61 returns to the starting position due to the action of the spring 66 and the cover blade 35 no longer covers the lens aperture. In the meantime, the shutter blades 42 and 43 are moved in front of the lens aperture.

If the diaphragm setting control 21' is set at one of the diaphragm values in the scale 22', the pin 64 of the lever 62 engages region II' of the control edge 21b'. When this occurs, the coupling disc 63 moves, due to the influence of the spring 66, to a position in which the projection 61a is moved out of the path of motion of the driving pin 46 of the shutter blade actuating lever 41. Under such conditions, the coupling disc 61 and, in the final analysis, the cover blade 35, remain stationary and unaffected during the run-down of the shutter.

What is claimed is:
1. A photographic shutter comprising:
 (a) a shutter housing;
 (b) a diaphragm settable to different aperture sizes;
 (c) an exposure time control for setting a desired exposure time;
 (d) a diaphragm control for setting said diaphragm at a desired aperture size and having at least one additional position at which the diaphragm aperture is maintained at the smallest aperture size;
 (e) a shaft rotatably positioned in a wall of said housing;
 (f) a cover blade mounted on said shaft and movable with said shaft to cover said aperture of said diaphragm;
 (g) a main shutter blade;
 (h) means for driving said shutter blade to cover said aperture;
 (i) a coupling mechanism fixed to said shaft and rotatable with said shaft;
 (j) and means responsive to said diaphragm control for positioning said coupling mechanism to engage said driving means when said diaphragm control is set at said additional position to drive said cover blade sufficiently to cover the smallest diaphragm aperture.
2. A photographic shutter comprising:
 (a) a shutter housing;
 (b) a diaphragm settable to different aperture sizes;
 (c) an exposure time control for setting a desired exposure time;
 (d) a diaphragm control for setting said diaphragm at a desired aperture size and having at least one additional position at which the diaphragm aperture is maintained at the smallest aperture size;
 (e) a shaft rotatably positioned in a wall of said housing;
 (f) a cover blade mounted on said shaft and movable with said shaft to cover said aperture of said diaphragm;
 (g) a main shutter blade;
 (h) means for driving said shutter blade to cover said aperture;
 (i) a coupling member fixed to said shaft and rotatable with said shaft and having a radial projection;
 (j) and means responsive to said diaphragm control for positioning said projection to engage said driving means when said diaphragm control is set at said additional position to drive said cover blade sufficiently to cover the smallest diaphragm aperture.

3. A photographic shutter of the cocking type comprising:
 (a) a shutter housing;
 (b) a diaphragm settable to different aperture sizes;
 (c) an exposure time control for setting a desired exposure time;
 (d) a diaphragm control for setting said diaphragm at a desired aperture size and having at least one additional position at which the diaphragm aperture is maintained at the smallest aperture size;
 (e) a shaft rotatably positioned in a wall of said housing;
 (f) a main shutter assembly;
 (g) a cover shutter blade mounted on said shaft and movable with said shaft to cover said aperture of said diaphragm;
 (h) means for cocking said main shutter assembly;
 (i) a driving disc coupled to said main shutter assembly for opening said aperture of said diaphragm when said driving disc is actuated, said driving disc having a lug for arresting said main shutter assembly in a cocked position until said driving disc is actuated;
 (j) a coupling member fixed to said shaft and rotatable with said shaft;
 (k) a pawl rotatably mounted on said shaft and engaging said coupling member for one direction of rotation of said pawl;
 (l) and means responsive to said diaphragm control for positioning said pawl in the path of movement of said lug on said driving disc when said diaphragm control is set at said additional position to drive said cover blade sufficiently to cover the smallest diaphragm aperture.

4. A photographic shutter of the automatic cocking type comprising:
 (a) a shutter housing;
 (b) a diaphragm settable to different aperture sizes;
 (c) an exposure time control for setting a desired exposure time;
 (d) a diaphragm control for setting said diaphragm at a desired aperture size and having at least one additional position at which the diaphragm aperture is maintained at the smallest aperture size;
 (e) a shaft rotatably positioned in a wall of said housing;
 (f) a main shutter assembly;
 (g) a cover shutter blade mounted on said shaft and movable with said shaft to cover said aperture of said diaphragm;
 (h) a shutter blade actuating member coupled to the shutter blades of said main shutter assembly for opening and closing said blades in said main shutter assembly;
 (i) means for imparting a reciprocating motion to said shutter blade actuating member to open and close said shutter blades of said main shutter assembly;
 (j) a driving pin affixed to said shutter blade actuating member;
 (k) a coupling member fixed to said shaft and rotatable with said shaft and having first and second radial projections;
 (l) means responsive to said diaphragm control for positioning said first radial projection to engage said driving pin when said diaphragm control is set at said additional position;
 (m) and a pawl for engaging said second radial projection to arrest said cover shutter blade in the position of covering said aperture of said diaphragm until said blades of said main shutter assembly close said aperture of said diaphragm.

No references cited.

JOHN M. HORAN, *Primary Examiner.*